United States Patent
Hung

(10) Patent No.: US 9,696,081 B2
(45) Date of Patent: Jul. 4, 2017

(54) BUBBLE-TYPE SNOWFLAKE MAKER

(71) Applicant: ANTARI LIGHTING & EFFECTS, LTD., Taoyuan (TW)

(72) Inventor: Ping-Fa Hung, Taoyuan (TW)

(73) Assignee: Antari Lighting & Effects, Ltd., Taoyuan (TW)

( * ) Notice: Subject to any disclaimer, the term of this patent is extended or adjusted under 35 U.S.C. 154(b) by 0 days.

(21) Appl. No.: 15/052,969

(22) Filed: Feb. 25, 2016

(65) Prior Publication Data

US 2017/0122642 A1    May 4, 2017

(30) Foreign Application Priority Data

Oct. 30, 2015  (TW) .............................. 104135698 A

(51) Int. Cl.
| | |
|---|---|
| F25C 3/04 | (2006.01) |
| A63J 5/02 | (2006.01) |
| A01G 15/00 | (2006.01) |
| E03C 1/084 | (2006.01) |

(52) U.S. Cl.
CPC ............... *F25C 3/04* (2013.01); *A01G 15/00* (2013.01); *A63J 5/028* (2013.01); *E03C 1/084* (2013.01); *F25C 2303/046* (2013.01)

(58) Field of Classification Search
CPC ....... F25C 3/04; F25C 2303/046; A63J 5/028; A01G 15/00; E03C 1/084; A62C 99/0018
USPC ............. 239/2.1, 2.2, 14.1, 14.2, 211, 419.5, 239/428.5; 169/11, 15; 62/69, 74; 40/410
See application file for complete search history.

(56) References Cited

U.S. PATENT DOCUMENTS

| | | | | |
|---|---|---|---|---|
| 2,571,069 A | * | 10/1951 | Shearman ............... | A63J 5/028 239/211 |
| 3,601,313 A | * | 8/1971 | Berg ...................... | A01G 15/00 239/2.1 |
| 4,836,452 A | * | 6/1989 | Fox ....................... | B05B 7/0012 239/14.1 |
| 2004/0056110 A1 | * | 3/2004 | Guerra .................... | A63J 5/028 239/2.2 |

(Continued)

*Primary Examiner* — Steven J Ganey
(74) *Attorney, Agent, or Firm* — Juan Carlos A. Marquez; Marquez IP Law Office, PLLC

(57) ABSTRACT

Disclosed is an improvement of a bubble-type snowflake maker. The interior of a machine body of a main machine is provided with accommodating space for disposing a blower that is used to send out wind power towards an air outlet pipe and an air outlet; a pump transports bubble water to a bubble head along a flexible bubble water pipe; a tail end of the air outlet pipe is sleeved with a cloth sleeve extending outwardly, and the bubble head of the bubble water pipe is disposed in the air outlet pipe; the air outlet is outwardly connected to a spray pipe having an inner pipe, and the air outlet pipe and the cloth sleeve extend into the pipe; the inner diameter of the inner pipe of the spray pipe is greater than the outer diameter of the air outlet pipe; and an inner annular toothed edge radially extends inwardly along a tail end of the inner pipe of the spray pipe. Wind power generated by the blower is blown to the interior and exterior of the cloth sleeve through the air pipe and the air outlet separately, so that the bubble water exudes from a surface of the cloth sleeve to form bubbles, and the wind power is used to blow the bubbles to fly away, so as to form artificial snowflakes.

4 Claims, 6 Drawing Sheets

(56) References Cited

U.S. PATENT DOCUMENTS

2012/0286059 A1* 11/2012 Willett .................... A63J 5/028
  239/14.2
2014/0124592 A1*  5/2014 Quee ........................ F25C 3/04
  239/14.2

\* cited by examiner

BUBBLE-TYPE SNOWFLAKE MAKER

BACKGROUND OF THE INVENTION

1. Field of the Invention

The present invention relates to a bubble-type snowflake maker, and more particularly to an improvement of a bubble-type snowflake maker that uses wind power for blowing.

2. Description of the Related Art

A scenario such as drama and stage is used as an example, and the scenario uses, when necessary, a bubble-type snowflake maker to produce flying artificial snowflakes in the background, so as to improve dramatic and stage effects.

Currently, components such as a blower and a pump are provided in a machine body of a bubble-type snowflake maker, so as to use the pump to feed bubble water, and then use the blower to blow, by using wind power, bubbles to fly away from an outlet to form artificial snowflakes, thereby making a scenario of flying artificial snowflakes.

However, in a practical operation of a conventional bubble-type snowflake maker, when a blower uses wind power to blow bubbles to fly away from an outlet to form artificial snowflakes, the bubbles spread out from the outlet by a large angle, thus relatively reducing blowing distances of the bubbles; and most of the bubbles move along an outer peripheral surface of the outlet and drop, thus causing a slippery floor of a site and reducing a bubble-type snowflake effect. Therefore, how to solve the aforementioned problems is the subject that needs to be studied by persons skilled in the art.

SUMMARY OF THE INVENTION

A main objective of the present invention is that: a bubble-type snowflake maker uses an inner annular toothed edge and inner sharp teeth of a spray pipe to enable bubbles to be sent out in a centralized manner along a middle part of a pipe, so as to increase blowing distances of the bubbles and improve a snowflake effect, and prevent most bubbles from moving along an outer peripheral surface of the spray pipe and dropping, thereby avoiding a slippery floor of a stage site.

To achieve the objective disclosed above, in the improvement of a bubble-type snowflake maker of the present invention, the interior of a machine body of a main machine is provided with accommodating space for disposing a blower including a motor and a fan, so as to enable the to blower to send out wind power towards an air outlet pipe and an air outlet surrounding an outer periphery of the air outlet pipe, and for disposing a pump connected to a bubble water pipe, a tail end of which is connected to a bubble head, so as to enable the pump to outwardly transport bubble water to the bubble head along the flexible bubble water pipe; a tail end of the air outlet pipe is sleeved with a cloth sleeve extending outwardly, and the bubble head of the bubble water pipe is disposed in the air outlet pipe; the air outlet is outwardly connected to a spray pipe having an inner pipe, and the air outlet pipe and the cloth sleeve extend into the pipe; the inner diameter of the inner pipe of the spray pipe is greater than the outer diameter of the air outlet pipe; and an inner annular toothed edge radially extends inwardly along a tail end of the inner pipe of the spray pipe. In the aforementioned improvement of a bubble-type snowflake maker, the blower is provided with a housing for accommodating the motor and the fan; an external side of the housing is connected to the air outlet pipe and the air outlet; and a plurality of annularly arranged and spaced air outlet holes are provided on the housing and between the air outlet pipe and the air outlet, so as to be in communication with the inner pipe of the spray pipe. In the aforementioned improvement of a bubble-type snowflake maker, the inner annular toothed edge of the spray pipe has a plurality of annularly arranged and connected inner sharp teeth.

In the aforementioned improvement of a bubble-type snowflake maker, the pump is disposed in the machine body of the main machine; and two opposite radial holes are separately disposed at outer peripheries of the spray pipe and the air outlet pipe, so that a tail end of the bubble water pipe enters the air outlet pipe through the two radial holes, so as to be connected to the bubble head.

BRIEF DESCRIPTION OF THE DRAWINGS

The invention will be described according to the appended drawings in which.

PREFERRED EMBODIMENT OF THE PRESENT INVENTION

Figure 1:
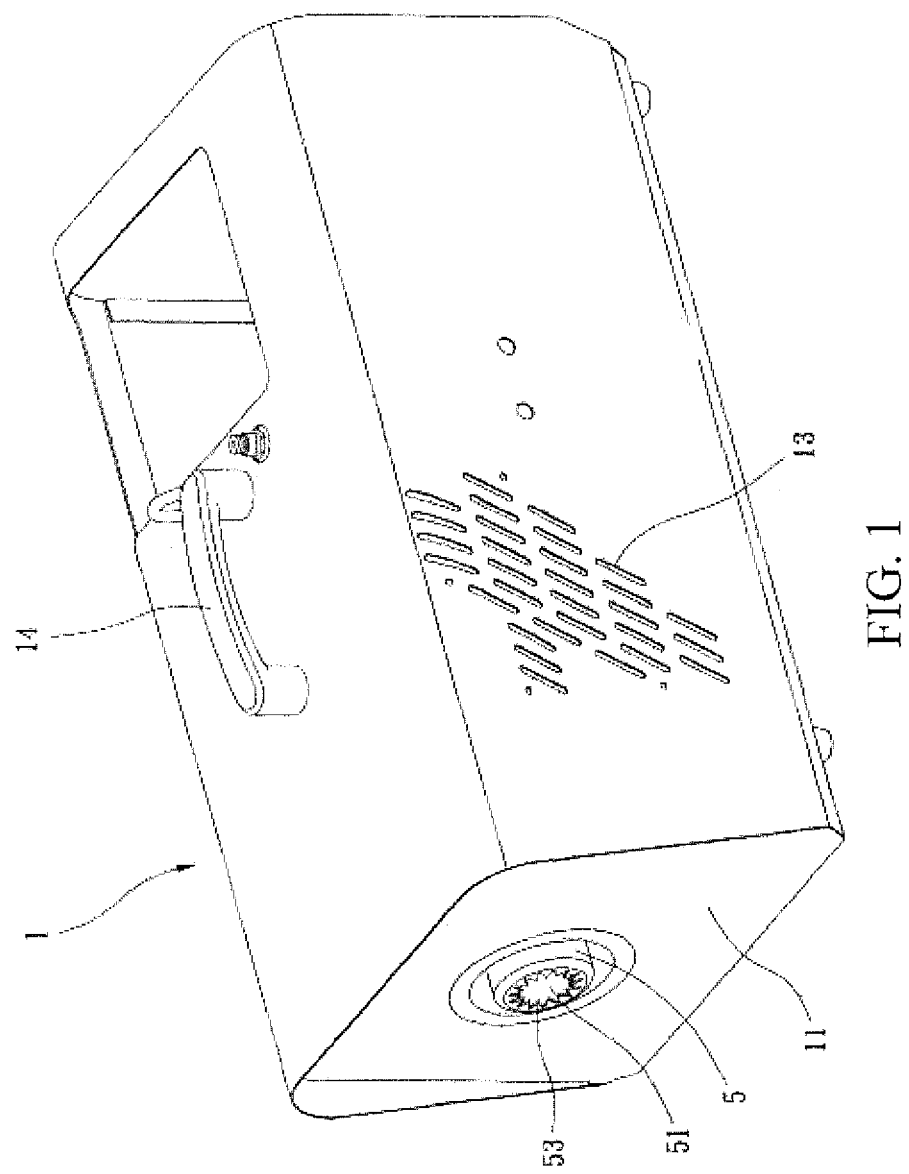
FIG. 1 is a three-dimensional diagram of an improvement of a bubble-type snowflake maker according to an embodiment of the present invention.

The technical means used in the present invention for achieving the aforementioned objective and effects thereof are described below by using feasible embodiments as examples and referring to drawings.

First, referring to FIG. 1 to FIG. 5, it can be clearly seen from the figures that an improvement of a bubble-type snowflake maker of the present invention includes a main machine 1, a blower 2, a pump 3, a cloth sleeve 4, and a spray pipe 5, wherein:

a machine body 11 of the main machine 1 is provided with an air inlet hole 13 and a handle 14; the interior of the machine body 11 is provided with accommodating space 12 (referring to FIG. 2) for disposing a blower 2 including a housing 21, a motor 22, a power cable 221, and a fan 23; the motor 22 and the fan 33 are accommodated and disposed in the housing 21 of the blower 2; a housing wall 211 at an external side of the housing 21 is provided with a plurality of air inlet holes 24, and a housing wall 212 at the other external side is outwardly connected to an air outlet pipe 26 and an air outlet 25 surrounding an outer periphery of the air outlet pipe 26; and a plurality of annularly arranged and spaced air outlet holes 27 are disposed on the housing wall 212 and between the air outlet pipe 26 and the air outlet 25, so that the blower 2 sends out wind power towards the air outlet 25. The interior of the machine body 11 is provided with a pump 3 connected to a bubble water pipe 31, and a tail end of the bubble water pipe 3 is connected to a bubble head 33 containing a plurality of micropores, so that the pump 3 transports bubble water 32 to the bubble head 33 along the flexible bubble water pipe 31.

The cloth sleeve 4 is sleeved at a tail end of the air outlet pipe 26 of the blower 2, so that the cloth sleeve 4 extends outwardly and coordinates with a girding belt 41 for positioning. The bubble head 33 of the bubble water pipe 31 is disposed in the air outlet pipe 26.

The spray pipe 5 has an inner pipe 51 and an inlet 52; as shown in FIG. 3 to FIG. 6, the inlet 52 of the spray pipe 5 is connected to the air outlet 25 of the blower 2, and is positioned by using a screw 57 to screw opposite through holes 251, 55, so as to enable the air outlet pipe 26 and the cloth sleeve 4 to extend into the inner pipe 51; the inner diameter of the inner pipe 51 of the spray pipe 5 is greater than the outer diameter of the air outlet pipe 26; an inner annular toothed edge 53 radially extends inwardly along a tail end of the inner pipe 51 of the spray pipe 5; and the inner annular toothed edge 53 has a plurality of annularly arranged and connected inner sharp teeth 54. Moreover, two opposite radial holes 261, 56 (referring to FIG. 4 and FIG. 6) are separately disposed at outer peripheries of the spray pipe 5 and the air outlet pipe 26, so that a tail end of the bubble water pipe 31 enters the air outlet pipe 26 through the two radial holes 261, 56, so as to be connected to the bubble head 33.

Figure 2:
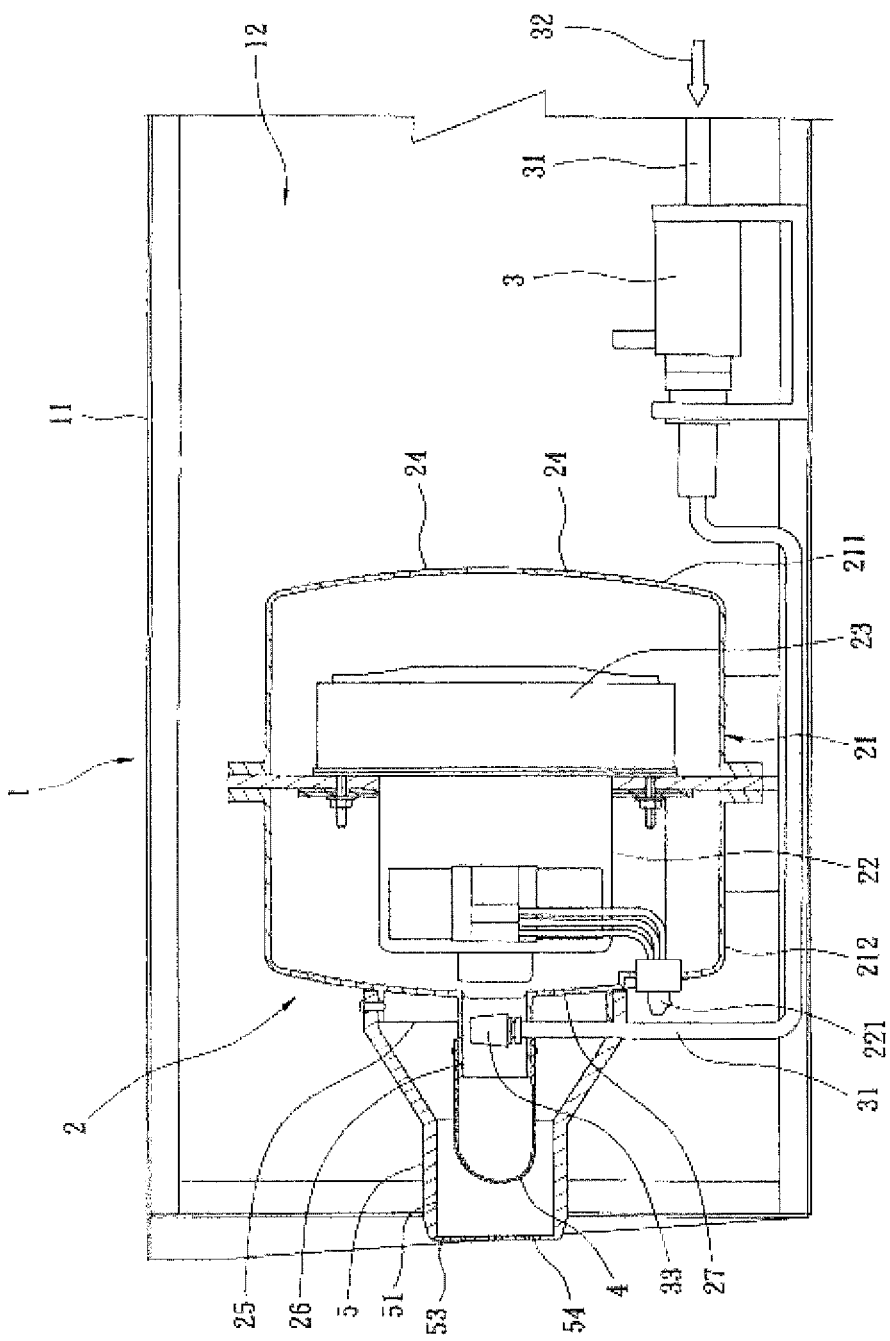
FIG. 2 is an enlarged sectional diagram of the bubble-type snowflake maker according to FIG. 1.
Figure 3:
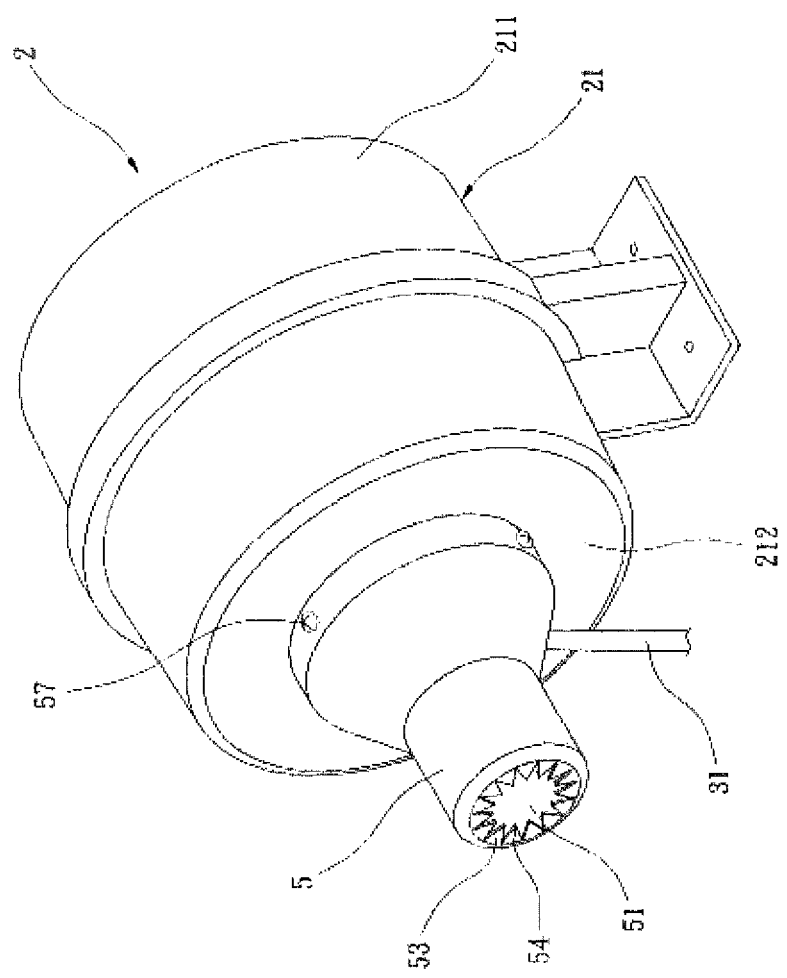
FIG. 3 is a three-dimensional diagram of a blower and a spray pipe according to FIG. 2.
Figure 4:
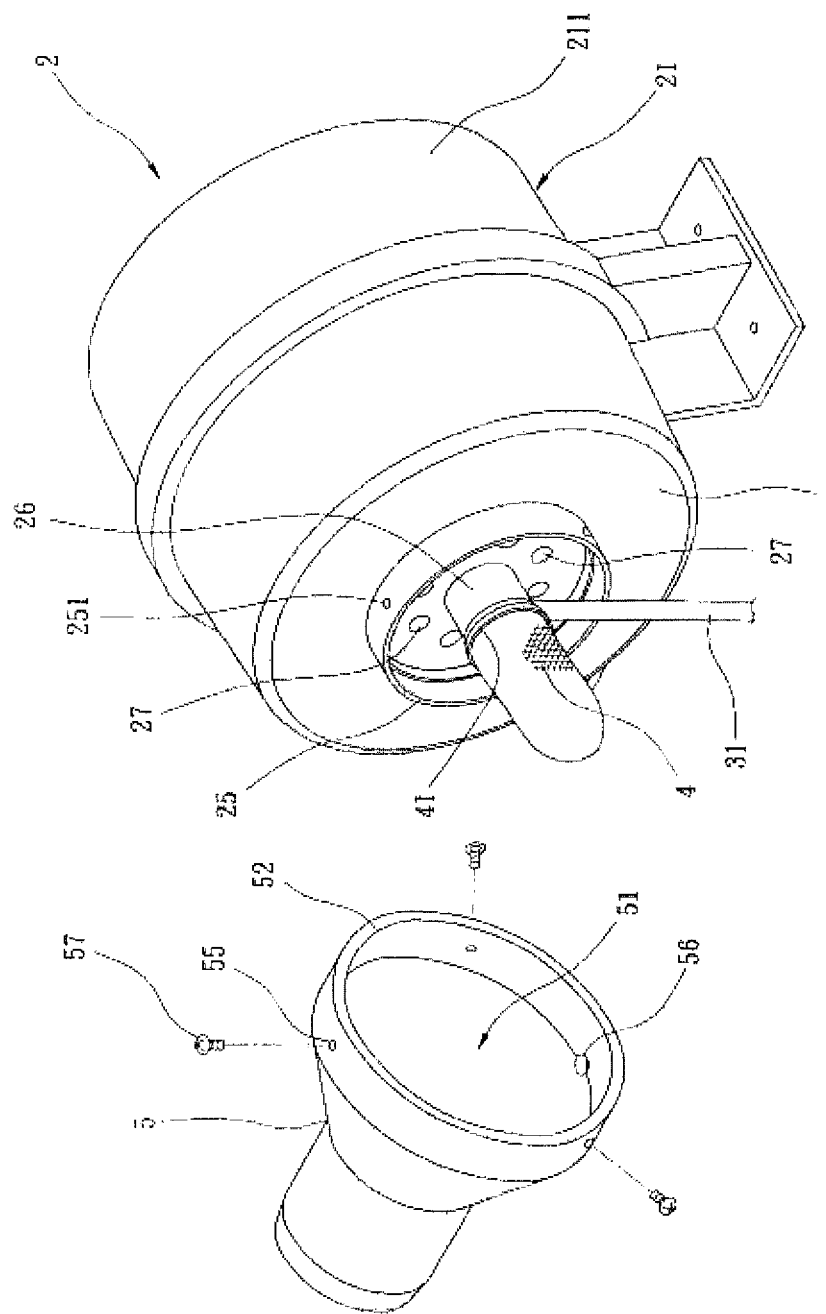
FIG. 4 is a three-dimensional exploded diagram of the blower and the spray pipe according to FIG. 3.
Figure 5:
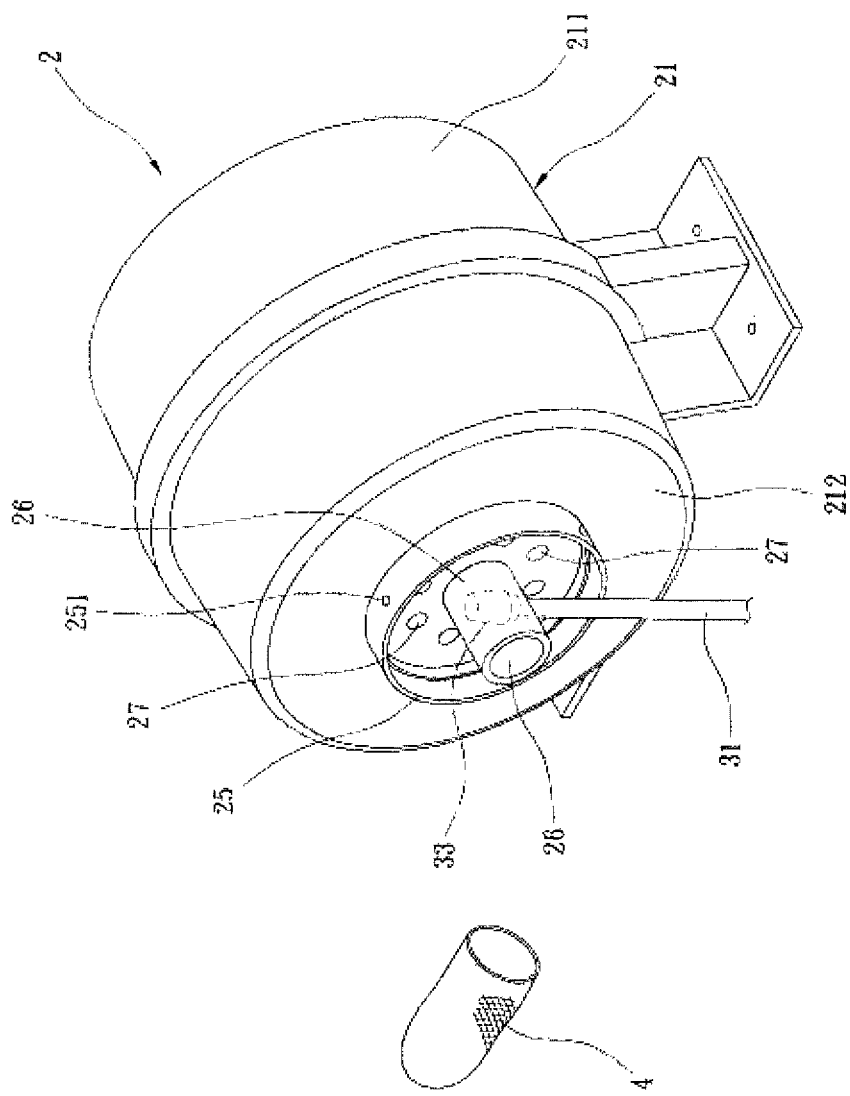
FIG. 5 is a three-dimensional exploded diagram of a cloth sleeve and the blower according to FIG. 4.
Figure 6:
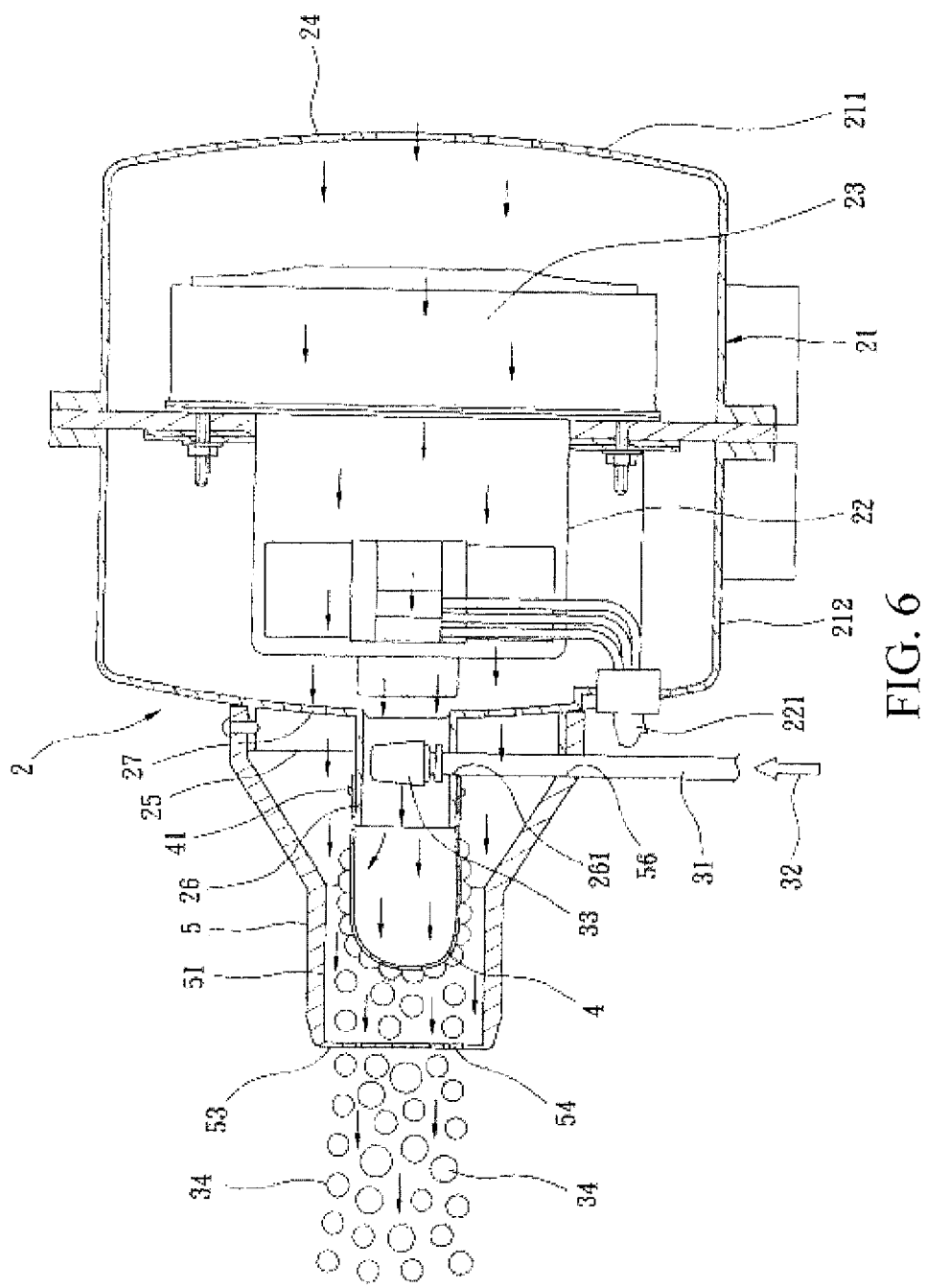
FIG. 6 is a diagram of an improvement of a bubble-type snowflake maker in use according to an embodiment of the present invention.

When the bubble-type snowflake maker is practically used, as shown in FIG. 2, FIG. 3, and FIG. 6, the bubble water 32 enters the pump 3 through the bubble water pipe 31, then is delivered, by the bubble water pipe 31, to the bubble head 33 for refining, and then enters the cloth sleeve 54; the motor 22 and the fan 23 in the blower 2 are controlled to provide wind power, so that the wind power generated by the blower 2 is blown out through the air outlet pipe 26 and the air outlet holes 27, and then is blown to the exterior and interior of the cloth sleeve 4; the wind power at the interior forces the bubble water 32 to exude from a surface of the cloth sleeve 4; and then the wind power of the air from the air outlet holes 27 annularly arranged at the outer periphery of the air outlet pipe 26 functions to enable bubbles 34 exuded from the cloth surface to fly outwardly and to be sent out through the inner pipe 51 of the spray pipe 5, so as to form artificial snowflakes. In addition, the inner annular toothed edge 53 and the inner sharp teeth 54 of the spray pipe 5 function to enable the bubbles 34 to be sent out in a centralized manner along a middle part of the pipe 561, so as to increase blowing distances of the bubbles 34, improve a snowflake effect, and prevent most bubbles 34 from moving along an outer peripheral surface of the spray pipe 5 and dropping, thereby avoiding a slippery floor of a stage site.

The above-described embodiments are only used for the convenience of describing the present invention, but are not intended to limit the present invention. Various simple variations and modifications made by persons killed in the art without departing from the idea and scope of the present invention shall fall within the following claims.

LIST OF REFERENCE NUMERALS

1. Main machine
11. Machine body
12. Accommodating space
13. Air inlet hole
14. Handle
2. Blower
21. Housing
211. Housing wall
212. Housing wall
22. Motor
221. Power cable
23. Fan
24. Air inlet hole
25. Air outlet
251. Through hole
26. Air outlet pipe
261. Radial hole
27. Air outlet hole
3. Pump
31. Bubble water pipe
32. Bubble water
33. Bubble head
34. Bubble
4. Cloth sleeve
41. Girding belt
5. Spray pipe
51. Inner pipe
52. Inlet
54. Inner sharp teeth
55. Through hole
56. Radial hole
57. Screw

What is claimed is:

1. An improvement of a bubble-type snowflake maker, wherein the interior of a machine body of a main machine is provided with accommodating space for disposing a blower comprising a motor and a fan, so as to enable the blower to send out wind power towards an air outlet pipe and an air outlet surrounding an outer periphery of the air outlet pipe, and for disposing a pump connected to a bubble water pipe, a tail end of the bubble water pipe is connected to a bubble head, so as to enable the pump to outwardly transport bubble water to the bubble head along the bubble water pipe; a tail end of the air outlet pipe is sleeved with a cloth sleeve extending outwardly, and the bubble head of the bubble water pipe is disposed in the air outlet pipe; the air outlet is outwardly connected to a spray pipe having an inner pipe, and the air outlet pipe and the cloth sleeve extend into the inner pipe; an inner diameter of the inner pipe of the spray pipe is greater than an outer diameter of the air outlet pipe; and an inner annular toothed edge radially extends inwardly along a tail end of the inner pipe of the spray pipe.

2. The improvement of a bubble-type snowflake maker according to claim 1, wherein the blower is provided with a housing for accommodating the motor and the fan; an external side of the housing is connected to the air outlet pipe and the air outlet; and a plurality of annularly arranged and spaced air outlet holes are provided on the housing and between the air outlet pipe and the air outlet, so as to be in communication with the inner pipe of the spray pipe.

3. The improvement of a bubble-type snowflake maker according to claim 1, wherein the inner annular toothed edge of the spray pipe has a plurality of annularly arranged and connected inner sharp teeth.

4. The improvement of a bubble-type snowflake maker according to claim 1, wherein the pump is disposed in the machine body of the main machine; and two opposite radial holes are separately disposed at outer peripheries of the spray pipe and the air outlet pipe, so that a tail end of the bubble water pipe enters the air outlet pipe through the two radial holes, so as to be connected to the bubble head.

* * * * *